125,247

UNITED STATES PATENT OFFICE.

WILLIAM ADAMSON AND CHARLES F. A. SIMONIN, OF PHILADELPHIA, PENNSYLVANIA, ASSIGNORS TO THE SAID ADAMSON.

IMPROVEMENT IN TREATING VEGETABLES FOR FOOD.

Specification forming part of Letters Patent No. 125,247, dated April 2, 1872.

Specification describing an Improvement in Treating Articles of Vegetable Diet, invented by WILLIAM ADAMSON and CHARLES F. A. SIMONIN, of Philadelphia, Pennsylvania.

*Improvement in Treating Articles of Vegetable Diet.*

Our invention consists in treating vegetables, fruits, and other agricultural products commonly used as food, with hydrocarbon, as explained hereafter, so as to thoroughly desiccate the same, and reduce them to a condition in which they can be preserved for any length of time, and in which they can be granulated or ground, so as to be easily packed for transportation, and be ready for use in the preparation of articles of food. Our invention further consists of articles of vegetable diet, treated as described hereafter, and forming a new article of commerce.

We have ascertained, by many tests, that vegetables can be most effectually desiccated and reduced to the best condition for preservation and for conversion into articles of diet by treatment with hydrocarbon-vapor.

Selecting the common sweet potato as an example of the many vegetables which admit of such treatment, we prefer, in the first instance, to deprive the roots of their skins and cut them into slices prior to the hydrocarbon-vapor treatment, which may be accomplished in many different ways and by different apparatus. For instance, apparatus substantially like that described in the patent granted to Lewis S. Robbins March 24, 1868, for extracting oily and fatty matters, reissued October 3, 1871, might be employed; or the apparatus described in William Adamson's patent No. 117,135, for extracting resins, &c., granted July 18, 1871; or that described in William Adamson's patent No. 118,668, for treating animal and vegetable substances, granted September 5, 1871. We prefer the latter apparatus, as vegetables can be subjected therein to hydrocarbon vapors under a determinate pressure, and as the vapor, after acting on the vegetables, is condensed and used again and again, so that there is little or no waste of hydrocarbon. The process described in the patent No. 119,188, for extracting fatty substances, granted to William Adamson, assignee of C. F. A. Simonin, may also be employed in carrying out our invention.

The effect of the hydrocarbon vapor on the potatoes is to thoroughly desiccate them, all watery matter being extracted, without dislodging the saccharine and other nutritious properties of the vegetable. After being exposed to the air, or being dried by heated air, the vegetable loses nearly all traces of hydrocarbon, and the latter may be entirely removed by soaking in water, and during the process of cooking.

The hydrocarbon treatment renders the vegetable crisp and friable, so that it can be easily granulated and packed in a small compass for transportation; in fact, it may be ground to the condition of flour, and in this state, either alone or in conjunction with other nutritious substances, used in the preparation of a variety of articles of diet.

In treating sweet potatoes we have found that, after subjecting them to benzine vapor under pressure for from six to eight hours, they are completely desiccated, and can be preserved for any length of time.

The slight traces of hydrocarbon which remain after exposure, instead of being a defect, render the desiccated vegetables a valuable article of commerce, inasmuch as they are protected by the hydrocarbon from the ravages of insects.

Although the sweet potato has been referred to above, for the reason that we have found it to be a vegetable which can be subjected to the treatment with the best results, common white potatoes, parsnips, and other garden vegetables, as well as apples and other fruits, and, in fact, all agricultural products which are used as food, and which it is desirable to preserve, may be subjected to the same treatment.

An important result of my invention is such a great reduction in the bulk of the vegetables that the latter can be transported and shipped in a very small compass.

In carrying out our invention, we prefer to use the light and volatile hydrocarbons, such as benzine, benzole, gasoline, or naphtha.

We do not desire to restrict ourselves to any specific appliances or process for conducting the treatment described; but

We claim as our invention—

1. Treating articles of vegetable diet substantially in the manner and for the purpose described.

2. Articles of commerce, consisting of vegetables and fruits, treated substantially in the manner described.

In testimony whereof we have signed our names to this specification in the presence of two subscribing witnesses.

WILLIAM ADAMSON.
CHS. F. A. SIMONIN.

Witnesses:
WM. A. STEEL,
HARRY SMITH.